United States Patent [19]

Holliday

[11] Patent Number: 5,349,256
[45] Date of Patent: Sep. 20, 1994

[54] LINEAR TRANSDUCER

[76] Inventor: Jeffrey C. Holliday, 19524 Young Rd., Guysville, Ohio 45735

[21] Appl. No.: 52,472

[22] Filed: Apr. 23, 1993

[51] Int. Cl.$^5$ .......................................... H02K 41/00
[52] U.S. Cl. ......................................... 310/12; 310/15
[58] Field of Search ................... 310/12, 13, 14, 15, 310/23, 24, 30, 34, 35

[56] References Cited

U.S. PATENT DOCUMENTS

| | | | |
|---|---|---|---|
| 2,842,688 | 7/1958 | Martin | 310/27 |
| 3,136,934 | 6/1964 | Henry-Baudot | 318/130 |
| 3,500,079 | 3/1970 | Barthalon | 310/15 |
| 3,542,495 | 11/1970 | Barthalon | 310/24 |
| 3,816,776 | 6/1974 | Chari | 310/12 |
| 3,891,874 | 6/1975 | Roters et al. | 310/12 |
| 4,210,831 | 7/1980 | Hurst | 310/13 |
| 4,349,757 | 9/1982 | Bhate | 310/35 |
| 4,395,649 | 7/1983 | Thome et al. | 310/24 |
| 4,454,426 | 6/1984 | Benson | 310/12 |
| 4,500,827 | 2/1985 | Merritt et al. | 310/12 |
| 4,542,311 | 9/1985 | Newman et al. | 310/13 |
| 4,546,277 | 10/1985 | Carbonneau et al. | 310/13 |
| 4,602,174 | 7/1986 | Redlich | 310/15 |
| 4,623,808 | 11/1986 | Beale et al. | 310/15 |
| 4,697,113 | 9/1987 | Young | 310/15 |
| 4,928,028 | 5/1990 | Leibovich | 310/23 |
| 4,937,481 | 6/1990 | Vitale | 310/15 |
| 4,945,269 | 7/1990 | Kamm | 310/15 |
| 5,202,595 | 4/1993 | Sim et al. | 310/13 |

*Primary Examiner*—Steven L. Stephan
*Assistant Examiner*—Judson H. Jones
*Attorney, Agent, or Firm*—Marshall & Melhorn

[57] ABSTRACT

A linear transducer includes a pair of electrical conductors and first and second transducer members. The electrical conductors are spaced apart along a reference axis. The first and second transducer members are positioned transversely adjacent to each other for relative axial movement. They form a magnetic path of high permeance about each of the electrical conductors. The first transducer member includes a magnetic flux source having a transversely oriented internal magnetic field vector. It extends axially between the electrical conductors to complete two variable magnetic flux circuits. One such flux circuit links each of the conductors. The second transducer member has a magnetic flux dividing separator to variably apportion magnetic flux from the flux source between the resulting magnetic flux circuits as the transducer members move axially relative to each other.

52 Claims, 7 Drawing Sheets

_FIG_ 9

_FIG_ 10

LINEAR TRANSDUCER

TECHNICAL FIELD

This invention relates to linear transducers for effecting conversions between electrical energy and kinetic energy.

BACKGROUND OF THE INVENTION

Linear-motion electro-mechanical transducers, referred to herein as linear transducers, are useful in a number of applications, and are particularly useful in conjunction with reciprocating motion devices such as Stirling cycle machines.

Optimum efficiency is a primary consideration in the design of a linear transducer, with regard to utilization of power, heat, materials, size, and weight. The ratio of energy output to transducer weight is one factor which is particularly important. Minimizing plunger mass is another important consideration, in order to minimize the momentum which must be periodically reversed during machine reciprocation. When a transducer is to be used with a free-piston Stirling engine, axial symmetry around the longitudinal axis of reciprocation may be important to allow the plunger to rotate or spin. Optimum utilization of magnetic fields is another important design consideration, as is preservation of flux source magnetization.

Figure 1:
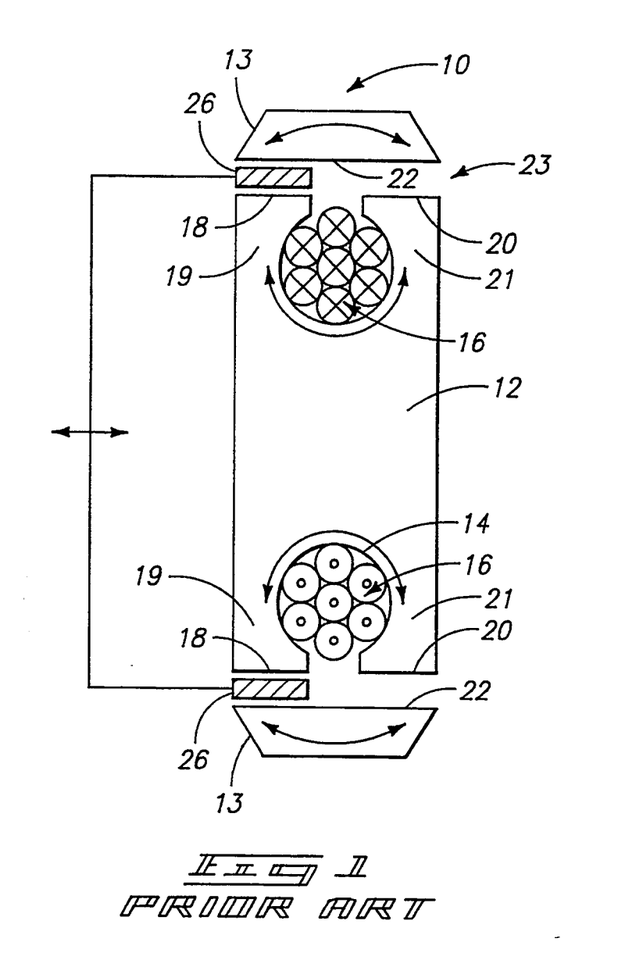
FIG. 1 is a cross-sectional view of a prior art linear transducer.

FIG. 1 is a cross-sectional view of a prior art linear transducer 10 which has been found to have an efficient and desirable design. This linear transducer is described by Robert W. Redlich in his U.S. Pat. No. 4,602,174 (FIGS. 4-7 of the Redlich patent). Transducer 10 comprises a high-permeability stator, including an inner stator block 12 and an outer stator block 13. As described in the referenced patent, blocks 12 and 13 can be diametrically opposite one another, duplicated in quadrature, or continuously revolved in a circular, axially-symmetrical embodiment. In each instance, inner stator block 12 has an annular peripheral channel 14 which contains a toroidal electrical coil or winding 16.

Channel 14 is surrounded by a pair of poles 19 and 21 which extend radially outward from inner stator block 12 on either side of electrical winding 16. Poles 19 and 21 have generally cylindrical outwardly-facing surfaces which form a pair of inner pole faces 18 and 20, respectively.

Outer stator block 13 spans inner pole faces 18 and 20. It has an inwardly facing surface which forms an outer pole face 22 opposite to and facing inner pole faces 18 and 20. The inner and outer pole faces have generally complementary diameters, with the diameter of inner pole faces 18 and 20 being smaller than the corresponding diameter of outer pole face 22 so that an annular air gap 23 extends axially through the stator. Inner and outer stator blocks 12 and 13 form a magnetic path around electrical winding 16 as shown by the arrows in FIG. 1.

An annular magnet 26 is positioned to reciprocate longitudinally within annular air gap 23, between the inner and outer pole faces. Magnet 26 has a radially-oriented magnetic polar axis. It has an axial length approximately equal to the axial length of a single inner pole face, and does not axially span the two inner pole faces 18 and 20. As magnet 26 reciprocates axially from one inner pole face to the other, it alternately completes magnetic flux circuits of opposite polarity around coil 16, producing an electric current within coil 16.

While the linear transducer shown in FIG. 1 performs well in many applications, it has several disadvantages. One disadvantage is that magnet 26 must repeatedly travel through an intermediate position, in the "gap" between inner pole faces 18 and 20, in which there is no adjacent high permeability path for magnetic flux. Repeated transitions between high and low permeability conditions eventually degrade magnet performance. Also, the flux source is exposed to opposing fields from other flux sources or other parts of the same flux source.

Another disadvantage of transducer 10 is that any resulting magnetic flux circuit around coil 16 always includes a relatively large air gap between the outer pole face and one inner pole face. This large gap tends to reduce the magnetic flux intensity in the flux circuit, therefore reducing efficiency and limiting peak power output. In addition, the induction in the stator block of transducer 10 is heteropolar, resulting in relatively high specific core losses. This reduces the efficiency of the device.

The invention described below is a linear transducer which addresses the efficiency factors mentioned above and eliminates the noted disadvantages of the prior art.

BRIEF DESCRIPTION OF THE DRAWINGS

Preferred embodiments of the invention are described below with reference to the accompanying drawings:

FIG. 13 is a cross-sectional view of a fourth preferred embodiment of a linear transducer in accordance with the invention

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Constitution, Article 1, Section 8.

Figure 2:
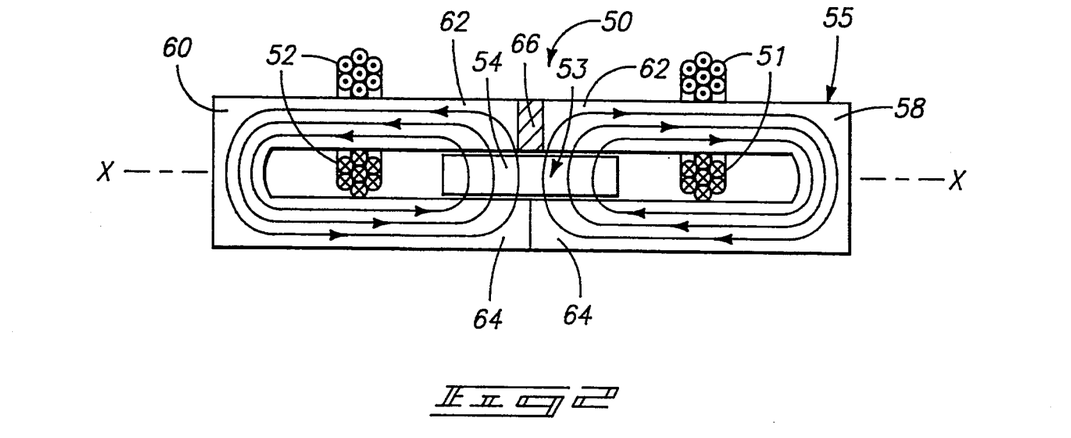
FIG. 2 is a diagrammatic representation of a linear transducer in accordance with the invention.
Figure 3:
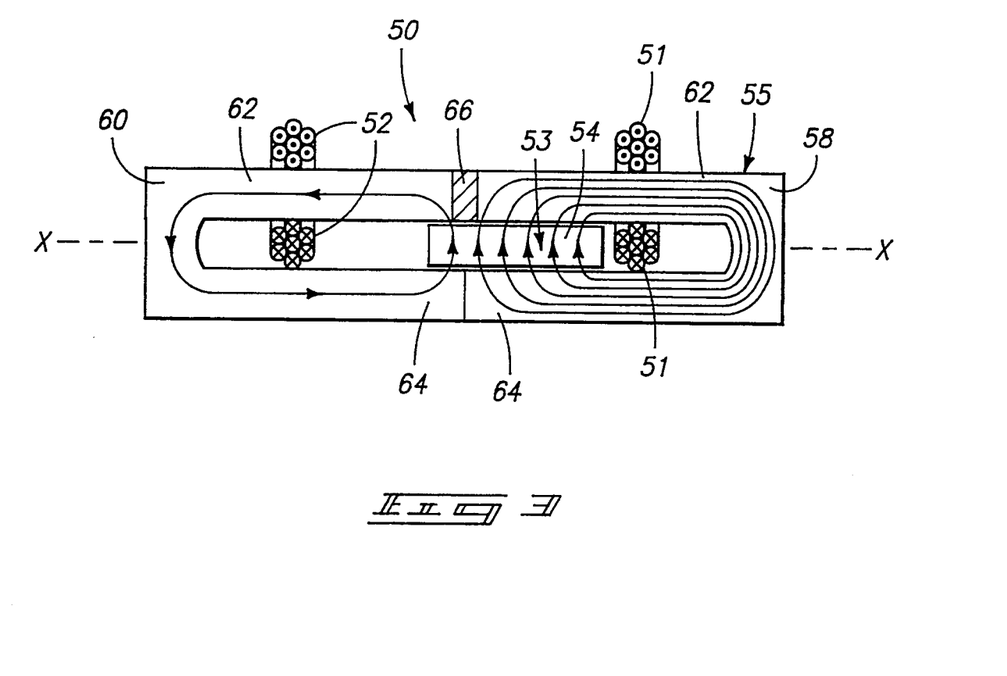
FIG. 3 is a diagrammatic representation of the transducer shown in FIG. 2, showing a magnetic flux source in an extreme axial position.
Figure 4:
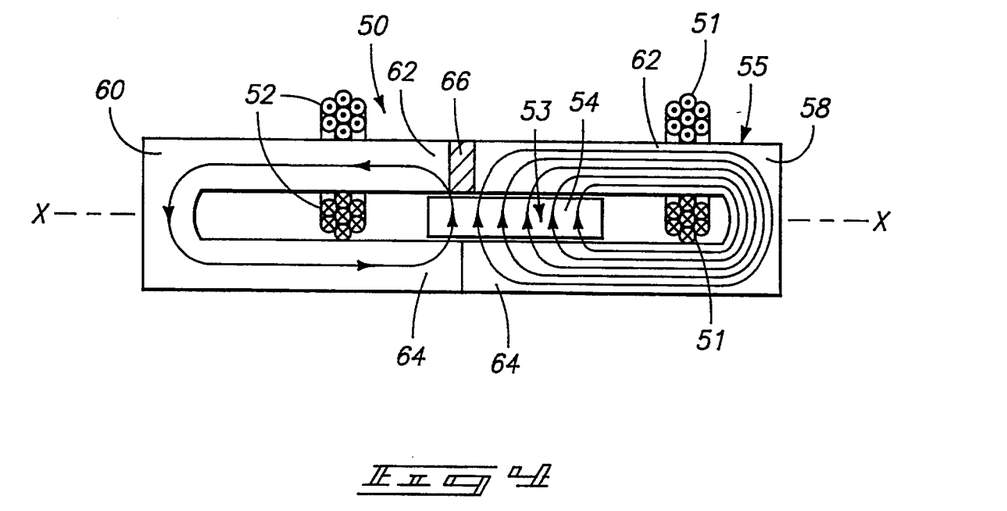
FIG. 4 is a diagrammatic representation of the transducer shown in FIG. 2, with a magnetic flux source and conductors in an extreme axial position.

FIGS. 2-4 show, in schematic form, many of the features incorporated in the preferred physical embodiments described below. FIG. 2 shows a linear transducer 50 which converts electrical energy to bi-directional mechanical force or velocity, or visa versa. More specifically, transducer 50 may be used either as a linear generator or motor. In addition, transducer 50 may be used as a displacement or motion sensor in applications where it is desired to track the linear position or velocity of a moving or reciprocating element. The term "linear" is used in a general sense and is intended to encompass the term "curvilinear." Similarly, the terms "axis," "axial," and "axially," as used below and in the claims, are not intended to foreclose transducers having curvilinear or other translational movements.

Transducer 50 comprises a pair of electrical conductors 51 and 52 separated from one another along a reference axis X—X. Each conductor optionally comprises a plurality of windings or wraps, depending upon the desired output characteristics of the transducer. Conductors 51 and 52 can be externally connected if desired.

Transducer 50 includes first and second magnetically permeable transducer members 53 and 55 which are positioned transversely adjacent to each other for relative axial movement. Transducer members 53 and 55 form magnetic paths of high permeability. Each such magnetic path links a single one of electrical conductors 51 and 52.

More specifically, first transducer member 53 includes an axially-extending magnetic flux source 54 positioned generally between the two conductors 51 and 52. Magnetic flux source 54 is an elongated permanent magnet having its north-to-south magnetization vector oriented along its transverse width, perpendicular to reference axis X—X. Flux source 54 extends partially between the two conductors 51 and 52 along reference axis X—X. Flux source 54 could alternatively comprise an electro-magnet configured to have a similar magnetic field as the permanent magnet of FIG. 2.

Second transducer member 55 comprises a yoke positioned around conductors 51 and 52 and flux source 54. The yoke is formed of a material having high magnetic permeability, such as iron or laminated iron. It surrounds or links conductors 51 and 52, having first and second U-shaped yoke sections 58 and 60. Each of yoke sections 58 and 60 has a pair of transversely opposed poles or limbs 62 and 64 which extend axially inward along the transverse sides of flux source 54. Second transducer member 55 thus forms two independent magnetic flux paths of high permeability: one through yoke section 58 to link conductor 51, and one through yoke section 60 to link conductor 52. Flux source 54, positioned between limbs 62 and 64 of yoke sections 58 and 60, completes an independent magnetic flux circuit through each of yoke sections 58 and 60 to independently link each of electrical conductors 51 and 52.

A flux dividing means, comprising a low permeability separator or gap 66, separates yoke sections 58 and 60 and divides the two magnetic flux paths from each other. Flux dividing separator 66 is axially positioned between electrical conductors 51 and 52, transversely adjacent flux source 54 and between the magnetic flux circuits. It essentially bisects second transducer member 55 to form opposed yoke sections 58 and 60. It also largely isolates the magnetic paths formed by yoke sections 58 and 60 from each other. Separator 66 can be positioned adjacent on one side of flux source 54, as shown. Alternatively, a separator could be positioned adjacent both sides of flux source 54.

Flux source 54 and flux dividing separator 66 are axially movable with respect to one another. As such movement occurs, flux dividing separator 66 apportions magnetic flux from flux source 54 between the two magnetic flux circuits formed by second transducer member 55.

For instance, as shown in FIG. 3, moving flux source 54 along the reference axis results in proportionally more of the flux produced by flux source 54 being apportioned to one of yoke sections 58 and 60, increasing the flux density linking one conductor while decreasing the flux density linking the other conductor. The changing flux density induces an electric field in conductors 51 and 52. If the conductors are connected to an external circuit, a varying electric current will be induced through the circuit. Similarly, providing a current through conductors 51 and 52 causes corresponding force or movement between flux source 54 and flux dividing separator 66. In most cases, flux dividing separator 66 has a narrow axial width so that substantially all of the magnetic flux from the magnetic flux source remains within one or the other of the two magnetic circuits.

FIG. 4 shows the result of moving second transducer member 55 and flux dividing separator 66 relative to a stationary flux source 54 and stationary conductors 51 and 52. As illustrated, the result is the same as shown in FIG. 3. In both cases, separator 66 effectively splits the flux lines emanating from flux source 54, directing them through separate flux paths. As the axial position of separator 66 varies, the magnetic field linking each of the conductors varies as well.

Flux dividing separator 66 can be formed from any type of material having a low magnetic permeability, such as air or a vacuum. In the preferred embodiments described below, the flux dividing separator comprises either an air gap or an integral section of solid material within an iron flux conductor. For example, the flux dividing separator may be formed of a plexiglass, Lexan, or phenolic.

Most embodiments constructed in accordance with the principles of this invention will necessarily include at least one low permeability flux circuit gap in each of the magnetic circuits. For instance, transducer 50 has a small transverse circuit gap between flux source 54 and the opposed yoke poles 62 and 64. Such a gap may be necessary to allow axial movement of flux source 54 relative to flux dividing separator 66. However, a significant advantage of the invention is that such gaps can be reduced to a minimum, in contrast to prior art devices such as the Redlich transducer described above. Specifically, the unique configuration enabled by the present invention allows all such circuit gaps to have transverse widths significantly less than the transverse width of the flux source.

The transducer described above provides a number of advantages over prior art devices. For instance, the use of a single flux source simplifies both design and construction. The fact that each conductor is lumped, rather than distributed axially as in some transducer designs, allows the device to be modelled by a filament at a single axial coordinate rather than requiring a model of an axially-extended surface.

Furthermore, all parts of the flux source are exposed to a high and essentially constant permeance external flux circuit throughout all extremes of operation. This is in sharp contrast to many existing transducers, which base their operation on a magnet being passed between high and low permeance external conditions. Here, each axial segment of the flux source is simply passed from one high permeance flux circuit to another, rather than being passed in and out of a single high permeance flux circuit. A related advantage is found in the fact that no part of the flux source is forced to withstand opposing magnetic fields from another flux source or from another part of the same flux source (except for reaction fields from the two conductors). These factors allow a high induction field operating point, resulting in high voltage characteristics and high resistance to demagnetization.

A small region of the magnetic flux source (the portion adjacent the low permeability flux dividing separator) can be subjected to external conditions of relatively lower permeance. However, the flux from this region that links each of the conductors remains constant throughout all positions of the flux source. The result is that the transducer has a highly linear transfer function. The structure also greatly reduces axial end effects, further improving the linear response of the device.

In addition, a narrow low permeability flux dividing separator will insure that all or nearly all flux emanating from the magnetic flux source, even that which emanates from adjacent the low permeability region, will enter one or the other of the yoke limb faces, thereby reducing losses and practically eliminating any need for shielding. These features prevent much of the eddy-braking and AC resistance power losses typical of prior devices.

Another advantage of the invention is that induction fields in the magnetic circuits are essentially homopolar, varying from zero to a maximum magnitude without changing sense or direction. This is in contrast to prior art devices in which the induction fields vary about zero. The invention can therefore be made to have a very low specific core loss.

In addition to the advantages described above, a device can be constructed in accordance with this invention to have a terminal inductance which is independent of relative positions between the operative parts of the machine.

Figure 5:
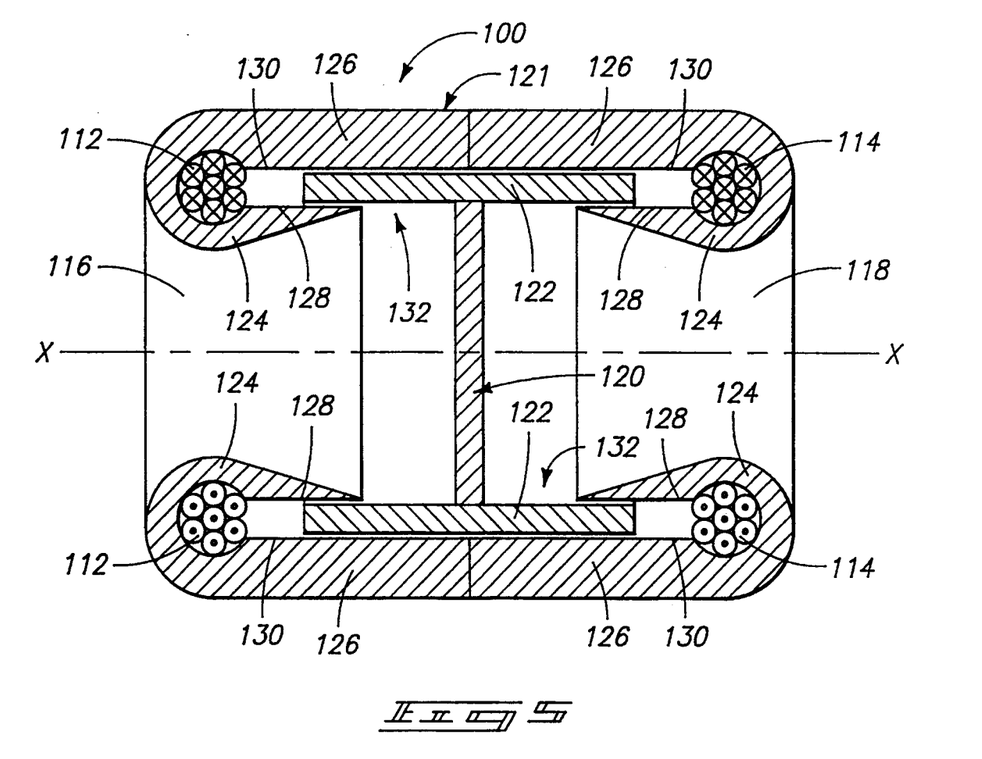
FIG. 5 is a cross-sectional view of a first preferred embodiment of a linear transducer in accordance with the invention.

FIG. 5 shows a simple yet practical physical embodiment of a linear transducer in accordance with the invention, generally designated by the reference numeral 100. Transducer 100 incorporates the general features of transducer 50, described above, comprising first and second transducer members 120 and 121 positioned transversely adjacent one another for relative axial movement. The general structure of the device is dictated by the shape of second transducer member 121, formed by a yoke which is generally in the shape of an elongated toroid or cylinder.

Second transducer member 121 is symmetrical about reference axis X—X. Although axial symmetry is not essential, it is preferred in many applications, particularly where the transducer is to be used with a rotating hydrodynamic bearing. Nevertheless, similar results can be obtained with differently shaped yoke cross-sections, such as polygonal, or with one or more discrete stacks. In addition, transducers can be coupled for increased output.

A pair of annular electrical conductors 112 and 114 are spaced from one another along reference axis X—X. The transducer members form two independent paths of high magnetic permeance to independently surround or link each of electrical conductors 112 and 114. Each magnetic path links a single one of the electrical conductors. Conductors 112 and 114 preferably comprise coils or windings which are electrically isolated from each other, at least with regard to internal connections. If desired, the windings or conductors can be externally connected.

Second transducer member 121 comprises a pair of axially opposed toroidal yoke sections 116 and 118 which form a stationary stator in the preferred embodiment. Yoke sections 116 and 118 are fabricated from a material of high magnetic permeability such as iron. They are sized, shaped, and positioned to form two paths of high magnetic permeance: one which links each of electrical conductors 112 and 114. To improve performance, yoke sections 116 and 118 are divided into radial or transverse laminations. In most applications electrical conductors 112 and 114 are fixed within yoke sections 116 and 118. However, a configuration in which electrical conductors 112 and 114 move relative to yoke sections 116 and 118 is also feasible.

First transducer member 120 forms a plunger which moves or reciprocates along reference axis X—X, and which in actual application is usually connected to an external mechanical device (not shown). First transducer member 120 comprises an annular magnetic flux source 122 which is symmetrical and coaxially centered about reference axis X—X. Magnetic flux source 122 has a transversely or radially oriented internal magnetic field vector. It extends axially between yoke sections 116 and 118 to complete two variable magnetic flux circuits: one through each of the magnetic paths linking electrical conductors 112 and 114. Magnetic flux source 122 is axially movable relative to yoke sections 116 and 118, along with first transducer member 120. The relative amount of flux linking each of conductors 112 and 114 depends on the axial position of flux source 122.

Each toroidal yoke section 116 and 118 has a generally U-shaped cross-section comprising transversely-opposed inner and outer yoke poles or limbs 124 and 126 which extend axially on opposite transverse sides of electrical conductors 112 and 114 and flux source 122. Limbs 124 and 126 of each yoke section 116 and 118 form transversely-opposed limb faces 128 and 130 which face each other. Inner limbs 124 extend toward each other, leaving a gap therebetween which forms a low permeability flux dividing separator 132. Outer limbs 126 are axially joined or adjacent to one another to form a solid outer cylindrical wall around the transducer. Preferably, no air gap is left between outer limbs 126.

The limb faces from each yoke section 116 and 118 align to form a continuous and elongated axially-extending air gap between electrical conductor 112 and electrical conductor 114. The U-shaped cross-section of each yoke section forms an independent magnetic path of high permeance between its corresponding limb faces to link a single one of electrical conductors 112 and 114.

Limb faces 128 and 130 are spaced from each other by a transverse or radial width which is approximately complementary to the transverse or radial width of magnetic flux source 122. Magnetic flux source 122 is positioned relative to yoke sections 116 and 118 for axial movement within the axially extending air gaps of yoke sections 116 and 118 to complete the two variable magnetic flux circuits which link electrical conductors 112 and 114.

As noted, second transducer member 121 has a low permeability flux dividing separator 132 between its inner limbs 124 to axially separate yoke sections 116 and 118. Flux dividing separator 132 is formed by an air gap which is positioned axially between electrical conductors 112 and 114 to variably apportion the magnetic flux from the magnetic flux source between the two magnetic circuits depending on the relative axial position of magnetic flux source 122. Flux dividing separator 132 has a narrow axial width so that substantially all of the magnetic flux from magnetic flux source 122 remains in one or the other of the magnetic circuits, thereby preventing flux leakage. Magnetic flux source 122 has an axial length sufficient to span low permeability flux dividing separator 132.

Figure 6:
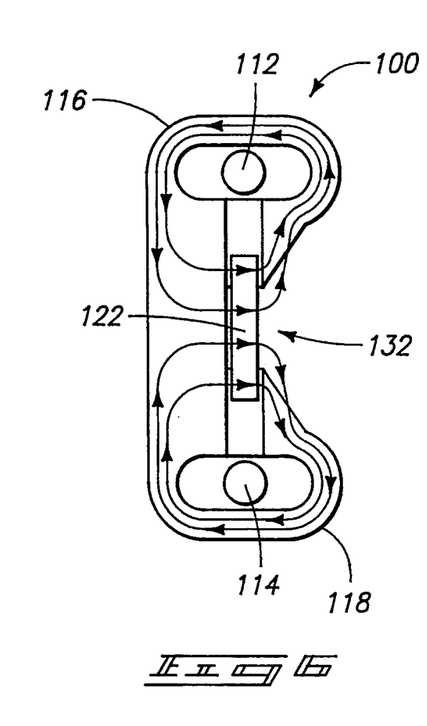
FIG. 6 is a diagrammatic representation of the transducer shown in FIG. 5, with a magnetic flux source shown in an intermediate position.
Figure 7:
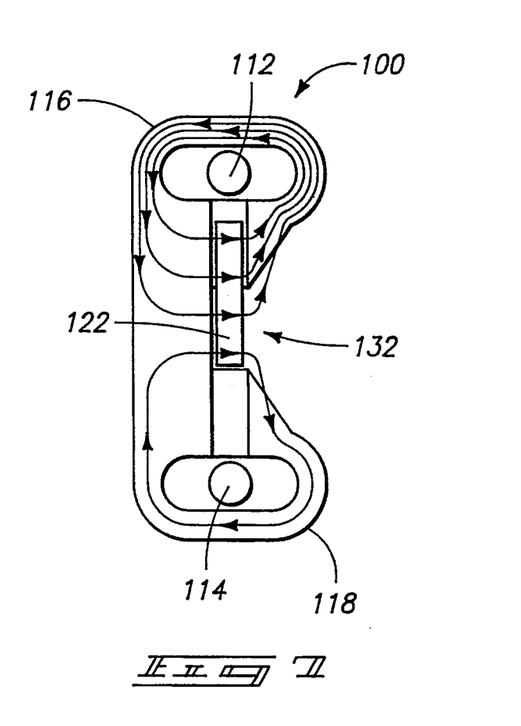
FIG. 7 is a diagrammatic representation of the transducer shown in FIG. 5, with the magnetic flux source shown in an extreme axial position.

Operation of transducer 100 is best observed with reference to FIGS. 6 and 7, in which simplified cross-sectional views are shown at two different transducer member positions. Transducer 100 usually operates in conjunction with relative oscillatory motion of first transducer member 120 and magnetic flux source 122. In FIG. 6, magnetic flux source 122 is shown in an intermediate position, midway between electrical conductor 112 and electrical conductor 114. Flux from flux source 122 is evenly divided between the circuits which link the two conductors.

In FIG. 7, flux source 122 is shown in an extreme axial position, toward yoke section 116 and electrical conductor 112. As a result of movement toward yoke section 116, most of the flux lines emanating from flux source 122 are directed through the flux circuit linking electrical conductor 112. The flux which links electrical conductor 114 is reduced in comparison to the intermediate position. Flux source 122 can be moved toward another extreme position, toward yoke section 118 and electrical conductor 114, causing the major portion of flux to link electrical conductor 114 through yoke section 118. By oscillating flux source 122 between its two extreme positions, the flux linking each of electrical conductors 112 and 114 varies from a minimum to a maximum, causing induced electro-motive forces in conductors 112 and 114.

Flux dividing separator 132 between the two magnetic paths insures that the flux entering a particular limb face will affect only the associated yoke section and conductor, and will not leak to the other yoke section. Such leakage would decrease flux changes from relative motion between the flux dividing separator and the flux source.

Limb faces 128 and 130 preferably have uniform widths and shapes along their axial length, forming an air gap of uniform transverse or radial width. This provides for linear transducer response, which is desired in most instances. However, in some cases it is desirable to provide limb faces and air gaps which vary along their axial length, thus creating non-linear (or corrected linear) transducer responses. The limb faces could also be varied to cause a magnetic spring force between components.

The embodiment described above has members 120 and 121 which can rotate relative to each other during operation. This feature is useful in certain applications, particularly where the invention must be connected to a Stirling cycle machine having hydrodynamic or "spin" bearings.

Further advantages result from extending the outer poles to meet each other. For instance, the solid cylindrical outer wall reduces leakage by presenting a constant, high permeability path at all points along the outer surface of the magnetic flux source. The solid outer wall also reduces the effect of external magnetic fields on the transducer. In addition, the embodiment of FIG. 5 is more resistant to demagnetization from temperature and current effects than previous devices.

Figure 8:
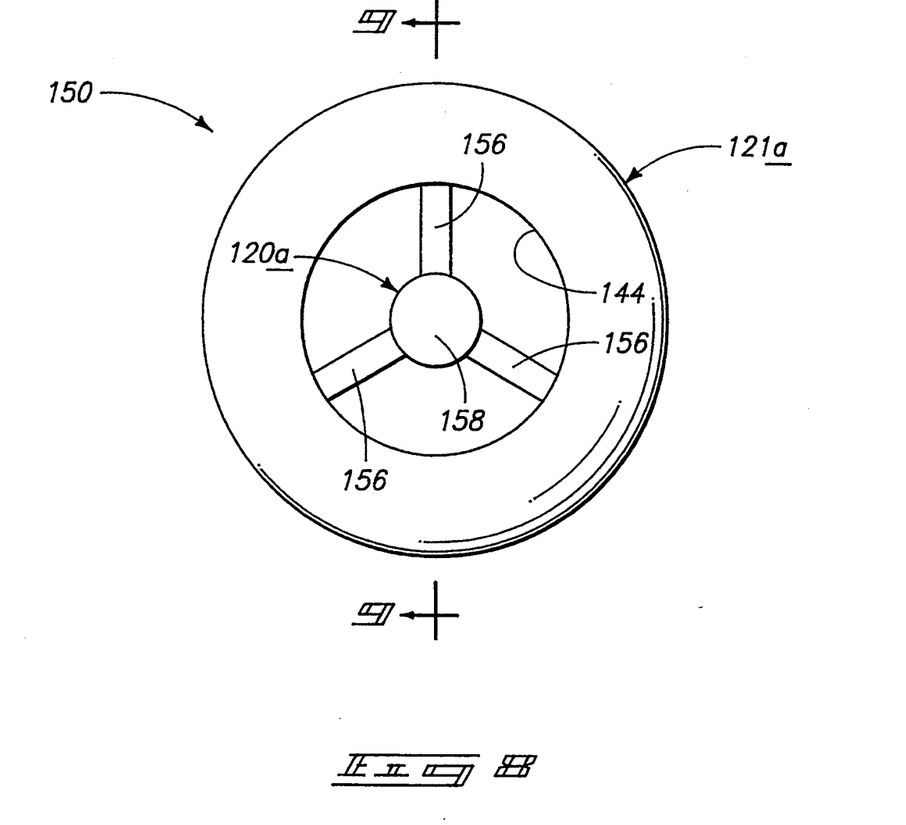
FIG. 8 is an end view of a second preferred embodiment linear transducer in accordance with the invention.
Figure 9:
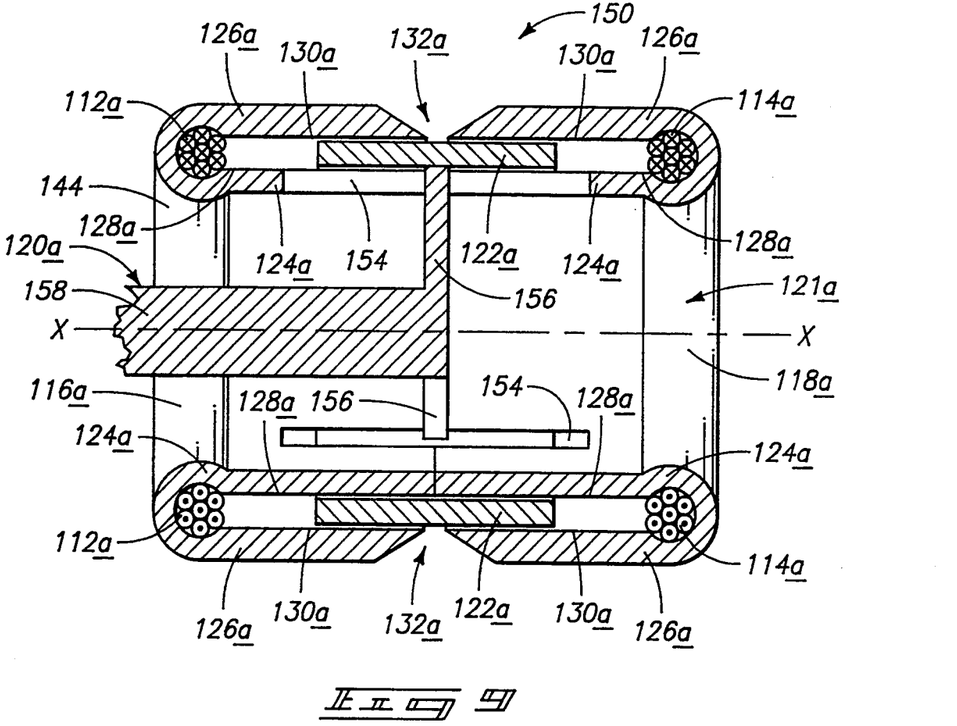
FIG. 9 is a cross-sectional view of the transducer shown in FIG. 8.

FIGS. 8 and 9 show a second preferred embodiment of a linear transducer in accordance with the invention, generally designated by the reference numeral 150. Transducer 150 is similar to transducer 100, shown in FIG. 5. Accordingly, similar components have been referenced by identical reference numerals, with the addition of the suffix "a" to the common reference numerals in FIGS. 8 and 9.

Transducer 150 comprises first and second transducer members 120a and 121a, both of which are preferably symmetrical about reference axis X—X, and which are configured for relative axial movement or reciprocation. A pair of annular electrical conductors 112a and 114a are spaced from one another along reference axis X—X.

Second transducer member 121a comprises a pair of axially opposed toroidal stator yoke sections 116a and 118a. Each of yoke sections 116a and 118a forms a path of high magnetic permeability which links a single one of conductors 112a and 114a. Conductors 112a and 114a are preferably fixed within yoke sections 116a and 118a.

First transducer member 120a moves or reciprocates along reference axis X—X. It comprises an annular magnetic flux source 122a coaxially centered about reference axis X—X. Magnetic flux source 122a has a transversely or radially oriented internal magnetic Yield vector. It extends axially between yoke sections 116a and 118a to complete two variable magnetic flux circuits: one through each of the magnetic paths linking electrical conductors 112a and 114a.

Each toroidal yoke section 116a and 118a has a generally U-shaped cross-section comprising transversely-opposed inner and outer yoke limbs 124a and 126a. Electrical conductors 112a and 114a are positioned between the yoke limbs. Limbs 124a and 126a of each yoke 116a and 118a extend axially inward, forming transversely-opposed pole faces 128a and 130a which face each other. Outer limbs 126a extend toward each other, leaving a low permeability flux dividing separator 132a therebetween. Inner limbs 124a, however, are axially joined to one another to form an inner cylindrical wall 144 within the transducer. No axial air gap need be left between inner poles 124a.

Inner cylindrical wall 144, formed by inner limbs 124a, has a plurality of axially extending slots 154. A plurality of spokes 156 extend generally radially inward from magnetic flux source 122a to a central plunger or member 158 along reference axis X—X.

Limb faces 128a and 130a define axially extending air gaps therebetween. The axially-extending air gaps from each yoke section 116a and 118a align to form a continuous and elongated annular gap extending axially between the electrical conductors and between the yoke sections. The U-shaped cross-section of each yoke section 116a and 118a forms a path of high magnetic permeance between its corresponding pole faces to link one of electrical conductors 112a and 114a.

The axially extending air gaps have transverse widths which are approximately complementary to the transverse width of magnetic flux source 122a. Magnetic flux source 122a is positioned relative to yoke sections 116a and 118a for axial movement within the axially extending air gaps of yoke sections 116a and 118a to complete the magnetic flux circuits linking electrical conductors 112a and 114a.

Transducer 150 has the advantage that its low permeability flux dividing separator 132a can be made much narrower than is the case with the previously described embodiment 100. In the previous embodiment, the low permeability flux dividing air gap was required to accommodate axial movement of the members, and was thereby required to be at least as long as the overall range of relative member movement. In transducer 150, however, axial plunger movement is accommodated by slots 154. Low permeability flux dividing separator 132a, being in the outer wall of the transducer, can be made as small as desired, as long as it is large enough to sufficiently isolate the two magnetic circuits from each other.

Because of the small flux dividing separator in transducer 150, essentially all of the magnetic flux source is subjected to high permeance external conditions. Therefore demagnetization tendencies are greatly reduced. Considerations such as this are critical in applications requiring a high degree of reliability, such as in systems which are to be used in outer space. The characteristics describe, immediately above also enable transducer 150 to have less length and total mass than the previously described embodiments, factors which are also important in many applications.

Figure 10:
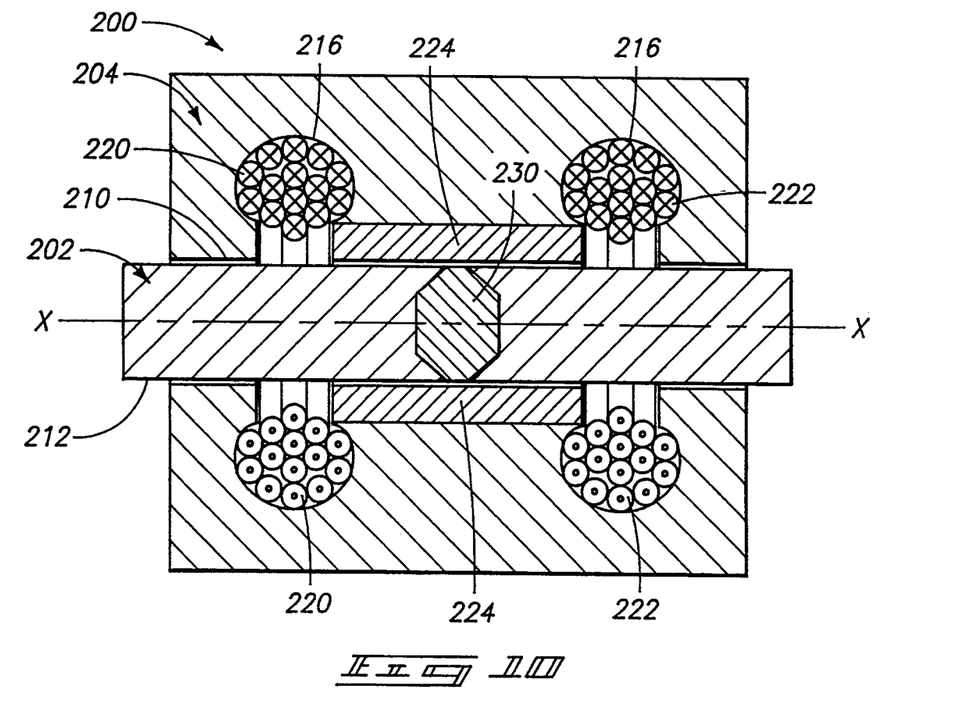
FIG. 10 is a cross-sectional view of a third preferred embodiment of a linear transducer in accordance with the invention.

FIG. 10 shows a cross-section of a third preferred embodiment of a linear transducer in accordance with the invention, generally designated by the reference numeral 200. Transducer 200 incorporates the unique features of transducer 50 (FIG. 2), comprising first and second transducer members 202 and 204, positioned transversely adjacent one another for relative axial motion. The general structure of the device is dictated by the shape of second transducer member 204, which is preferably a cylindrical block of iron alloy or iron alloy laminate.

First and second transducer members 202 and 204 are preferably symmetrical about a reference axis X—X, to allow free rotation of first transducer member 202 within second transducer member 204. Second transducer member 204 has an inner surface 210 coaxially entered about reference axis X—X. Inner surface 210 is preferably cylindrical. First transducer member 202 has an outer surface 212 which is sized and shaped to fit within and transversely adjacent to inner surface 210 of second transducer member 204 for axial movement or reciprocation relative thereto. Outer surface 212 is therefore also preferably cylindrical, having a diameter only slightly less than that of inner surface 210. In some cases it may be possible to provide a sliding or contacting fit between first and second transducer members 202 and 204.

Second transducer member 204 has an axially spaced pair of annular peripheral channels 216 which extend into second transducer member 204 from inner surface 210. A pair of electrical conductors 220 and 222 are fixedly received within annular channels 216. Electrical conductors 220 and 222 are thus spaced from one another along reference axis X—X. Each electrical conductor 220 and 222 preferably comprises an annular coil or winding. The number of wraps or turns in each winding is determined by the desired response characteristics of the transducer.

First and second transducer members 202 and 204 are made of a high permeability material such as iron, and are preferably laminated in the transverse or radial direction to improve performance. They are positioned and configured to form separate magnetic paths of high permeance linking each of electrical conductors 220 and 222.

A magnetic flux source 224 is positioned between second transducer member 204 and first transducer member 202. Magnetic flux source 224 is preferably annular in shape to correspond to the cylindrical shapes of the transducer members. Magnetic flux source 224 is preferably a permanent magnet having a transversely or radially oriented internal magnetic field vector. An electro-magnet can also be used, provided it is designed to produce a similar magnetic field. Magnetic flux source 224 is preferably fixed inside of second transducer member 204 between electrical conductors 220 and 222 to complete two variable magnetic flux circuits, one through each of the magnetic paths linking electrical conductors 220 and 222, respectively. Magnetic flux source 224 therefore forms an integral part of second transducer member 204, forming a portion of inner surface between 210 between conductors 220 and 222. Inner and outer surfaces 210 and 212 are preferably spaced from one another by a width less than the transverse width of magnetic flux source 224.

First transducer member 202 preferably comprises an elongated bar which is bisected by a low permeability flux dividing separator 230. Flux dividing separator 230 comprises a region of low permeability material. For example, flux dividing separator 230 may be formed of a plastic such as plexiglass, Lexan, or a phenolic. Low permeability flux dividing separator 230 extends within and throughout a transverse cross-section of first transducer member 202 to magnetically isolate the ends of first transducer member 202 from each other. However, the axial width of low permeability flux dividing separator 230 is as small as possible to provide minimal interference to external systems from flux emanating from magnetic flux source 224, so that substantially all of the magnetic flux from magnetic flux source 224 forms part of one or the other of the two magnetic circuits.

Magnetic flux source 224 and low permeability flux dividing separator 230 are positioned for relative axial movement. More specifically, first transducer member 202, including low permeability flux dividing separator 230, can move or reciprocate axially within second transducer member 204. Low permeability flux dividing separator 230 is axially positioned between electrical conductors 220 and 222 to variably apportion magnetic flux from magnetic flux source 224 between the two magnetic circuits depending on the relative axial position of the transducer elements. Low permeability flux dividing separator 230 therefore separates the magnetic flux circuits from each other and varies the flux density within each of the magnetic flux circuits.

Figure 11:
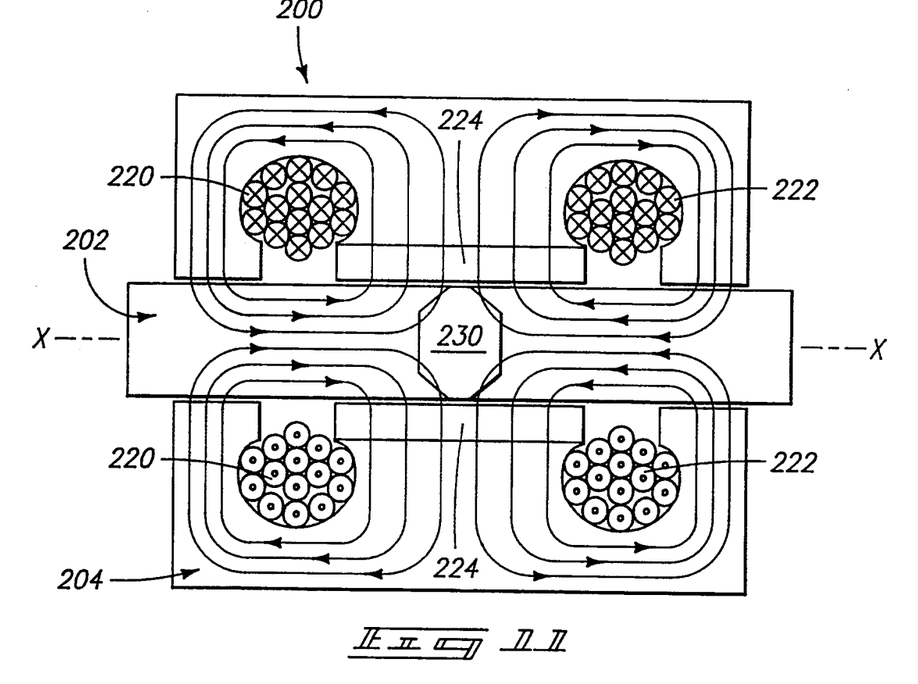
FIG. 11 is a diagrammatic representation of the transducer shown in FIG. 10, with a low permeability flux dividing gap shown in an intermediate position.
Figure 12:
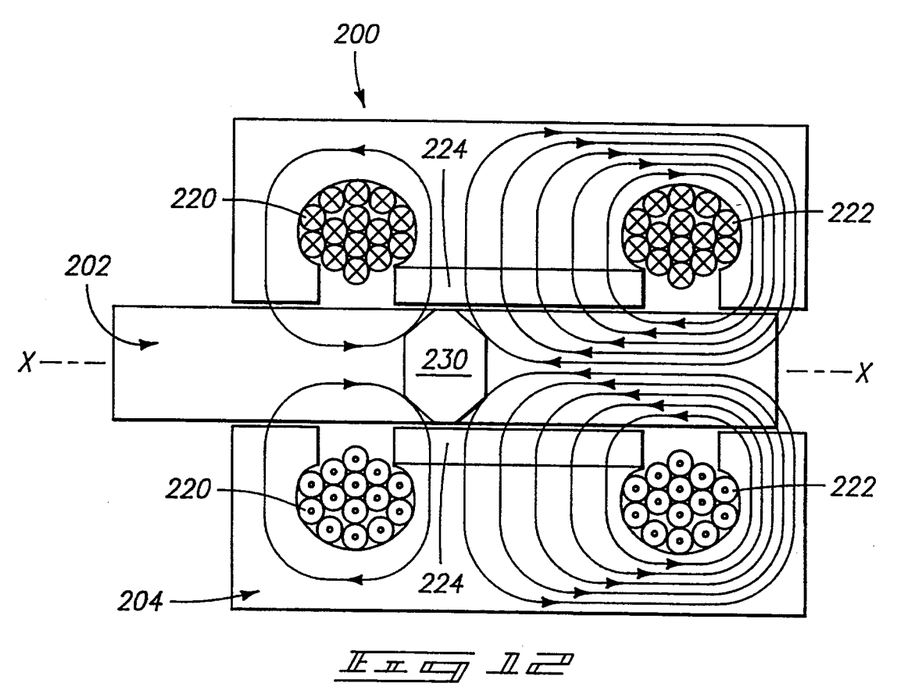
FIG. 12 is a diagrammatic representation of the transducer shown in FIG. 10, with the flux dividing separator shown in an extreme axial position.

FIGS. 11 and 12 illustrate operation of transducer 200. In FIG. 11, first transducer member 202 is shown in an intermediate position, with low permeability flux dividing separator 230 positioned midway between electrical conductors 220 and 222. Flux from flux source 224 is evenly divided between the magnetic circuit linking electrical conductor 220 and the magnetic circuit linking conductor 222. In FIG. 12, however, first transducer member 202 is shown in an extreme axial position, with low permeability flux dividing separator 230 positioned toward electrical conductor 220. In this position, very little flux flows in the circuit linking electrical conductor 220, while most of the flux from flux source 224 is directed by low permeability flux dividing separator 230 through the magnetic circuit linking electrical conductor 222. In the other extreme axial position (not shown), with low permeability flux dividing separator 230 positioned toward electrical conductor 222, most flux is directed through the magnetic circuit linking electrical conductor 220. Moving or oscillating first transducer member 202 within second transducer member 204 thereby varies the flux density in each of the two flux circuits, producing an electro-motive force and a corresponding current in each of electrical conductors 220 and 222.

Transducer 200 is particularly well suited to high temperature environments. This embodiment fixes the flux source and the conductors on the same body, allowing cooling of both components by cooling only second transducer member 204. Accordingly, transducer 200 can operate in a very hot environment while the magnet is protected from thermal demagnetization through cooling. This embodiment also permits a stationary magnet to be used in a mechanically robust structure.

FIG. 13 shows a cross-section of a fourth preferred embodiment of a linear transducer in accordance with the invention, generally designated by the reference numeral 300. Transducer 300 is similar in concept and operation to transducer 200 of FIG. 10, with the relative radial positions of the two transducer members essentially being reversed. Transducer 300 comprises first and second transducer members 302 and 304, positioned transversely adjacent one another for relative axial movement.

First and second transducer members 302 and 304 are preferably symmetrical about a reference axis X—X, to allow free rotation of first transducer member 302 within second transducer member 304. Second transducer member 304 is preferably a cylindrical sleeve or elongated cylinder having a cylindrical inner surface 310 coaxially centered about reference axis X—X. First transducer member 302 preferably comprises an elongated bar or hollow tube having an outer surface 312 which is sized and shaped to fit within and transversely adjacent to inner surface 310 of second transducer member 304 for axial movement or reciprocation relative thereto. Outer surface 312 is therefore also preferably cylindrical, having a diameter only slightly less than that of inner surface 310. In some cases it may be possible to provide a sliding or contacting fit between first and second transducer members 302 and 304.

First transducer member 302 has an axially spaced pair of annular peripheral channels 316 which extend into first transducer member 302 from outer surface 312. A pair of electrical conductors 320 and 322 are fixedly received within annular channels 316. Electrical conductors 320 and 322 are thus spaced from one another along reference axis X—X. Each electrical conductor 320 and 322 preferably comprises an annular coil or winding. The number of wraps or turns in each winding is determined by the desired response characteristics of the transducer. First and second transducer members 302 and 304 form two independent paths of high magnetic permeance, each linking a single one of electrical conductors 320 and 322. First and second transducer members 302 and 304 are made of a high permeability material such as iron, and are preferably laminated in the transverse or radial direction to improve performance.

A magnetic flux source 324 is positioned between second transducer member 304 and first transducer member 302. Magnetic flux source 324 is preferably annular in shape to correspond to the cylindrical shapes the transducer members. Magnetic flux source 324 is illustrated as an electro-magnet having externally-powered conductors 325. Conductors 325 must be sized and placed to create a transversely or radially oriented internal magnetic field vector. A permanent magnet could also be used as illustrated in the previous embodiments. Magnetic flux source 324 is fixed inside transducer member 302 between electrical conductors 320 and 322 to complete two variable magnetic flux circuits, one through each of the magnetic paths linking electrical conductors 320 and 322. Magnetic flux source 324 therefore forms an integral part of first transducer member 302, and also forms a portion of outer surface 312. Inner and outer surfaces 310 and 312 are preferably spaced from one another by a width less than the transverse width of magnetic flux source 324.

Second transducer member 304 is bisected by a low permeability flux dividing separator 330, comprising a region of low permeability material. For example, flux dividing separator 230 may be formed of material such as plexiglass, Lexan, or a phenolic. Low permeability flux dividing separator 330 extends completely around second transducer member 304 to substantially magnetically isolate the ends of second transducer member 304 from each other. However, the axial width of low permeability flux dividing separator 330 is as small as possible to provide minimal interference to external systems from flux emanating from magnetic flux source 324, so that substantially all of the magnetic flux from magnetic flux source 324 remains in one or the other of the magnetic circuits.

Magnetic flux source 324 and low permeability flux dividing separator 330 are positioned for relative axial movement. Low permeability flux dividing separator 330 is axially positioned between electrical conductors 320 and 322 to variably apportion magnetic flux from magnetic flux source 324 between the two magnetic circuits depending on the relative axial positions of the transducer elements. Low permeability flux dividing separator 330 therefore separates the magnetic flux circuits from each other and varies the flux density within each of the magnetic flux circuits.

Using an electro-magnet as the magnetic flux source allows creation of a variable magnetic transfer function which can be controlled over time or made to depend on the axial position of the transducer elements. This can be accomplished by controlling the electro-magnet currents as a function of a control variable such as relative axial member position, or by the selection of fixed electromagnet currents and locations. When used as a linear alternator, this feature can be used to control power and voltage output while maintaining constant stroke amplitude, to compensate for changing load conditions. Use of an electro-magnet in the place of a permanent magnet is not limited to transducer 300. Electro-magnets could be advantageously used in each of the embodiments described herein.

Transducer 300 has a very high operating temperature capability, in part due to the absence of permanent magnets. Permanent magnets have operating temperature limits due to Curie point or other permanent magnet demagnetization effects. Transducer 300 can be operated up to the temperature limits of the conductor and yoke materials. This feature is a tremendous advantage in high temperature power conversion systems such as space power Stirling systems.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A transducer comprising:
   a pair of electrical conductors spaced longitudinally from each other;
   first and second magnetically permeable transducer members positioned transversely adjacent to each other for relative longitudinal movement, the transducer members forming two magnetic paths of high permeance, wherein each such magnetic path links a single one of the electrical conductors;
   the first transducer member comprising a longitudinally-extending magnetic flux source having a transversely-oriented internal magnetic field vector, the flux source being positioned to complete two variable magnetic flux circuits, one such flux circuit being completed through each of the magnetic paths;
   the second transducer member having a flux dividing separator of low magnetic permeability which is positioned transversely adjacent the flux source to variably apportion magnetic flux from the flux source between the two magnetic flux circuits depending on the relative longitudinal positions of the transducer members.

2. The transducer of claim 1, wherein the magnetic flux source comprises a permanent magnet.

3. The transducer of claim 1, wherein the magnetic flux source comprises an electro-magnet.

4. The transducer of claim 1, wherein the magnetic flux dividing separator has a narrow longitudinal width so that substantially all of the magnetic flux from the magnetic flux source remains in one or the other of the magnetic circuits.

5. The transducer of claim 1, wherein the magnetic flux source is a permanent magnet having a transverse width, the transducer members forming at least one low permeability circuit gap in each magnetic flux circuit, wherein each such low permeability circuit gap has a transverse width which is less than the transverse width of the permanent magnet.

6. The transducer of claim 1, wherein:
   the second transducer member comprises a pair of longitudinally-opposed yoke sections, each yoke section having a pair of transversley-opposed limb faces defining gaps therebetween;
   the magnetic flux source is positioned to move within the gaps of the yoke sections to complete the magnetic flux circuits.

7. The transducer of claim 6, wherein the magnetic flux source comprises a permanent magnet with a transverse width, the limb faces being spaced from each other by a transverse width which is complementary to the transverse width of the permanent magnet.

8. The transducer of claim 6, wherein the magnetic flux source has a length sufficient to axially span the magnetic flux dividing separator.

9. The transducer of claim 6, wherein the electrical conductors are fixed to the yoke sections.

10. The transducer of claim 6, wherein each opposed yoke section has a generally U-shaped cross-section comprising first and second yoke limbs, the limb faces being formed along said first and second yoke limbs, the electrical conductors being positioned between the yoke limbs.

11. The transducer of claim 6, wherein each opposed yoke section has a generally U-shaped cross-section comprising first and second yoke limbs, the limb faces being formed along said first and second yoke limbs, the electrical conductors being positioned between the yoke limbs, the first limbs of the opposed yoke sections being joined to one another, the flux dividing separator being formed by a low permeance region between the second limbs of the opposed yoke sections.

12. The transducer of claim 1, wherein:
   the first transducer member comprises a first transducer block which receives the pair of electrical conductors and which forms the two magnetic paths; and
   the magnetic flux source is fixed to the first transducer block.

13. The transducer of claim 12, wherein the electrical conductors are fixed within the first transducer block.

14. The transducer of claim 12, wherein the first and second transducer blocks have complementary and transversely-adjacent surfaces, the magnetic flux source comprising a permanent magnet with a transverse width, the adjacent transducer block surfaces being spaced from one another by a width which is less than the transverse width of the permanent magnet.

15. The transducer of claim 12, wherein the magnetic flux source comprises a permanent magnet.

16. The transducer of claim 12, wherein the magnetic flux source comprises an electro-magnet.

17. A linear transducer comprising:
   a pair of electrical conductors separated from one another;
   a yoke forming two magnetic paths of high permeance, wherein each such magnetic path links one of the electrical conductors;
   a magnetic flux source having a transversely-oriented internal magnetic field vector, the magnetic flux source being positioned to complete two variable magnetic flux circuits, one such flux circuit being completed through each of the magnetic paths;
   flux dividing means for variably apportioning magnetic flux from the magnetic flux source between the two magnetic flux circuits in response to the relative positions of the magnetic flux source and the flux dividing means.

18. The transducer of claim 17, wherein the magnetic flux source comprises a permanent magnet.

19. The transducer of claim 17, wherein the magnetic flux source comprises an electro-magnet.

20. The transducer of claim 17, wherein the flux dividing means comprises a region of low magnetic permeability between the magnetic flux circuits.

21. The transducer of claim 17, wherein:
the yoke comprises a pair of opposed yoke sections, each yoke section having a pair of limb faces defining gaps therebetween, each yoke section forming one of the two magnetic paths between its limb faces; and
the magnetic flux source is positioned to move within the axially extending gaps of the yoke sections to complete the magnetic flux circuits.

22. The transducer of claim 21, wherein each opposed yoke section has a generally U-shaped cross-section comprising first and second yoke limbs, the limb faces being formed along said first and second yoke limbs, the electrical conductors being positioned between the yoke limbs.

23. The transducer of claim 21, wherein each opposed yoke section has a generally U-shaped cross-section comprising first and second yoke limbs, the limb faces being formed along said first and second yoke limbs, the electrical conductors being positioned between the yoke limbs, the flux dividing means comprising a region of low permeability between the first and second limbs of the opposed yoke sections.

24. The transducer of claim 21, wherein each opposed yoke section has a generally U-shaped cross-section comprising first and second yoke limbs, the limb faces being formed along said first and second yoke limbs, the electrical conductors being positioned between the yoke limbs, the first limbs of the opposed yoke sections being joined to one another, the flux dividing means comprising a region of low permeability between the second limbs of the opposed yoke sections.

25. The transducer of claim 21, wherein the flux dividing means comprises a region of low magnetic permeability transversely adjacent the magnetic flux source between the yoke sections.

26. The linear transducer of claim 17, wherein:
the yoke comprises a first transducer block which receives the pair of electrical conductors to form the two magnetic paths;
the transducer further comprises a second transducer block positioned transversely-adjacent the first transducer block, the first and second transducer blocks being movable relative to each other; and
the flux dividing means comprises a low permeability region within the second transducer block and transversely adjacent the magnetic flux source, the low permeability region moving along with the second transducer block.

27. The transducer of claim 26, wherein the magnetic flux source is fixed to the first transducer block.

28. The transducer of claim 26, wherein the magnetic flux source comprises a permanent magnet.

29. The transducer of claim 26, wherein the magnetic flux source comprises an electro-magnet.

30. The transducer of claim 26, wherein the first and second transducer blocks have complementary and transversely-adjacent surfaces, the magnetic flux source having a transverse width and being fixed to one of the transducer blocks, the adjacent transducer block surfaces being spaced from one another by a width which is less than the transverse width of the permanent magnet.

31. A linear transducer comprising:
a pair of annular electrical conductors spaced from one another along a reference axis;
a pair of axially opposed toroidal yoke sections spaced along the reference axis, each yoke section forming a magnetic path of high permeance which links one of the electrical conductors;
an annular magnetic flux source coaxially centered about the reference axis, the magnetic flux source having a transversely-oriented internal magnetic field vector and being positioned to complete two variable magnetic flux circuits, one of the flux circuits being completed through each of the magnetic paths, the magnetic flux source being axially movable; and
a magnetic flux dividing separator having a low permeability, the flux dividing separator being positioned to apportion the magnetic flux from the magnetic flux source between each of the magnetic circuits depending on the relative axial positions of the magnetic flux source and the flux dividing separator.

32. The linear transducer of claim 31, wherein each electrical conductor is fixed within one of the yoke sections.

33. The linear transducer of claim 31, the magnetic flux dividing separator having a narrow axial width so that substantially all of the magnetic flux from the magnetic flux source remains in one or the other of the magnetic circuits.

34. The linear transducer of claim 31, wherein the magnetic flux source is rotatable relative to the toroidal yoke sections.

35. The linear transducer of claim 31, wherein:
each toroidal yoke section has a generally U-shaped cross-section comprising transversely-opposed inner and outer limbs;
the opposed inner and outer limbs form axially extending gaps therebetween, one of the electrical conductors being received between the opposed limbs of each yoke section;
the magnetic flux source being positioned for axial movement within the axially extending gaps.

36. The linear transducer of claim 35, the magnetic flux source comprising a permanent magnet with a transverse width, the axially extending gaps having transverse widths which are approximately complementary to the transverse width of the magnet.

37. The linear transducer of claim 35, wherein:
the outer limbs of the opposed yoke sections are axially joined to one another;
the inner limbs of the opposed yoke sections extend toward one another, the magnetic flux dividing separator being formed by a region of low permeability between the inner limbs of the opposed yoke sections.

38. The linear transducer of claim 35, wherein:
the inner limbs of the opposed yoke sections are axially joined to one another, forming a cylindrical inner wall; and
the outer limbs of the opposed yoke sections extend toward one another, the magnetic flux dividing separator being formed by a region of low permeability between the outer limbs of the opposed sections.

39. The linear transducer of claim 35, further comprising:
a plurality of spokes which extend radially from the magnetic flux source through the yoke sections;
the inner limbs of the opposed yoke sections being joined to one another to form a cylindrical inner wall; and the cylindrical inner wall having axially extending slots, the spokes extending through the slots.

40. The linear transducer of claim 35, further comprising:
a plurality of radials which extend from the magnetic flux source through the yoke sections.

41. The linear transducer of claim 35, further comprising:
a plurality of spokes which extend radially inward from the magnetic flux source;
the inner limbs of the opposed yoke sections being joined to one another to form a cylindrical inner wall;
the cylindrical inner wall having axially extending slots, the spokes extending through the slots; and
the outer limbs of the opposed yoke sections extending toward one another, the magnetic flux dividing separator being formed by a low permeability region between the outer limbs of the opposed yoke sections.

42. A linear transducer comprising:
a pair of electrical conductors spaced from one another along a reference axis;
first and second magnetically permeable transducer members positioned to form two magnetic paths of high permeance, wherein each such magnetic path links a single one of the electrical conductors, the second transducer member having an inner surface coaxially centered about the reference axis, the first transducer member having an outer surface which is sized and shaped to fit within the second transducer member inner surface for axial movement relative thereto;
a magnetic flux source positioned between the second transducer member and the first transducer member, the magnetic flux source having a transversely-oriented internal magnetic field vector, the magnetic flux source being positioned to complete two variable magnetic flux circuits, one of the flux circuits being completed through each of the magnetic paths; and
a magnetic flux dividing separator having a low permeability to separate the magnetic flux circuits, the magnetic flux source and the magnetic flux dividing separator being positioned for relative axial movement between one another, whereby magnetic flux from the magnetic flux source is apportioned by the magnetic flux dividing separator between the two magnetic circuits.

43. The transducer of claim 42, wherein the electrical conductors are received within the second transducer member, the magnetic flux source being fixed to the second transducer member.

44. The transducer of claim 42, wherein the electrical conductors are received around the first transducer member, the magnetic flux source being fixed to the first transducer member outer surface.

45. The transducer of claim 42, wherein the second transducer member inner surface and the first transducer member outer surface are generally cylindrical and have complementary diameters.

46. The transducer of claim 42, wherein the first transducer member is sized and shaped to slide within the second transducer member.

47. The transducer of claim 42, wherein the first transducer member is an elongated bar of magnetically permeable material, the magnetic flux dividing separator comprising a region of low permeability material which axially bisects the elongated bar.

48. The transducer of claim 42, wherein the second transducer member comprises an elongated cylinder of magnetically permeable material, the magnetic flux dividing separator comprising a region of low permeability material axially bisecting the elongated cylinder.

49. The transducer of claim 42, wherein the magnetic flux source is a permanent magnet.

50. The transducer of claim 42, wherein the magnetic flux source is an electro-magnet.

51. The transducer of claim 42, the magnetic flux dividing separator having a narrow axial width so that substantially all of the magnetic flux from the magnetic flux source remains in one or the other of the magnetic circuits.

52. The transducer of claim 42, wherein the first and second magnetically permeable transducer members are rotatable relative to each other.

* * * * *